US009076377B2

(12) United States Patent
Yoshimoto

(10) Patent No.: US 9,076,377 B2
(45) Date of Patent: Jul. 7, 2015

(54) SIGNAL PROCESSING CIRCUIT, DISPLAY DEVICE AND ELECTRONIC APPARATUS

(71) Applicant: SEIKO EPSON CORPORATION, Tokyo (JP)

(72) Inventor: Hiroshi Yoshimoto, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 242 days.

(21) Appl. No.: 13/917,746

(22) Filed: Jun. 14, 2013

(65) Prior Publication Data

US 2013/0342588 A1 Dec. 26, 2013

(30) Foreign Application Priority Data

Jun. 21, 2012 (JP) ................................ 2012-139475

(51) Int. Cl.

| | |
|---|---|
| ***G09G 5/00*** | (2006.01) |
| ***G09G 5/02*** | (2006.01) |
| ***H04N 1/60*** | (2006.01) |
| ***H04N 5/44*** | (2011.01) |
| ***G09G 3/36*** | (2006.01) |
| ***G09G 3/20*** | (2006.01) |
| *G09G 3/32* | (2006.01) |

(52) U.S. Cl.

CPC ............ *G09G 3/2003* (2013.01); *G09G 3/3208* (2013.01); *G09G 3/3648* (2013.01); *G09G 2300/0452* (2013.01); *G09G 2340/06* (2013.01)

(58) Field of Classification Search

CPC combination set(s) only.
See application file for complete search history.

(56) References Cited

U.S. PATENT DOCUMENTS

| | | | | |
|---|---|---|---|---|
| 7,457,465 | B2 * | 11/2008 | Tomiyama et al. | 382/181 |
| 2005/0190140 | A1 * | 9/2005 | Asahi et al. | 345/100 |
| 2007/0236517 | A1 * | 10/2007 | Kimpe | 345/690 |
| 2008/0084525 | A1 | 4/2008 | Yamada | |
| 2008/0111812 | A1 * | 5/2008 | Shirasaki et al. | 345/212 |
| 2008/0259099 | A1 * | 10/2008 | Arai et al. | 345/690 |
| 2009/0184984 | A1 * | 7/2009 | Takahara | 345/690 |
| 2010/0259556 | A1 | 10/2010 | Inuzuka | |
| 2010/0259569 | A1 * | 10/2010 | Inuzuka | 345/690 |
| 2012/0026368 | A1 * | 2/2012 | Cote et al. | 348/242 |
| 2012/0098873 | A1 * | 4/2012 | Kanamori | 345/690 |
| 2012/0200594 | A1 * | 8/2012 | Yamada | 345/619 |

FOREIGN PATENT DOCUMENTS

| | | | |
|---|---|---|---|
| JP | 60-061724 | A | 4/1985 |
| JP | 2006-171049 | A | 6/2006 |
| JP | 2008-026339 | A | 2/2008 |

(Continued)

*Primary Examiner* — Wesner Sajous
(74) *Attorney, Agent, or Firm* — Maschoff Brennan

(57) ABSTRACT

A signal processing circuit supplies a gradation signal specifying a gradation to be displayed on pixels comprising; a conversion unit that extracts a extraction signal specifying a gradation to be displayed on a predetermined number of pixels including a certain pixel for each RGBW, from the video signal specifying a gradation to be displayed on a pixel for each RGBW, a storage unit that stores a predetermined number of coefficients for each RGBW, a first selection unit that selects a single color signal specifying a gradation to be displayed on a block with regard to a display color of a certain pixel, from the extraction signal, a second selection unit that acquires a predetermined number of coefficients corresponding to the display color of a certain pixel and a calculation unit that generates a gradation signal based on the outputs from the first selection unit and the second selection unit.

12 Claims, 8 Drawing Sheets

(56) References Cited

FOREIGN PATENT DOCUMENTS

| | | | |
|---|---|---|---|
| JP | 2008-096548 | A | 4/2008 |
| JP | 2008-170692 | A | 7/2008 |
| JP | 2010-249859 | A | 11/2010 |
| WO | 2006-068224 | A1 | 6/2006 |

* cited by examiner

SIGNAL PROCESSING CIRCUIT, DISPLAY DEVICE AND ELECTRONIC APPARATUS

BACKGROUND

1. Technical Field

The present invention relates to a signal processing circuit, a display device and an electronic apparatus.

2. Related Art

There are proposed various types of display devices capable of displaying a plurality of display colors. For example, in JP-A-60-601724, there is proposed a display device that includes a liquid crystal display panel in which four types of pixels each having red, green, blue and white color are arranged in a Bayer array pattern.

In the display device capable of displaying the plurality of display colors such as red, green, blue and white, one display color among the plurality of display colors is assigned with respect to each of the pixels included in the display device. Therefore, a filter processing is required, that extracts a signal specifying a gradation of one display color assigned to each pixel, from a video data specifying a gradation with regard to the plurality of display colors.

In the related art, since the filter processing is performed using an individual circuit for each display color, there has been a problem in that the circuit size of the circuit which performs the filter processing, becomes large.

SUMMARY

An advantage of some aspects of the invention is to realize a simplified circuit that performs a filter processing in the display device capable of displaying a plurality of display colors.

According to an aspect of the invention, there is provided a signal processing circuit that is a display processing circuit used in a display device in which any of a first display color, a second display color, a third display color and fourth display color is assigned to each of a plurality of pixels, and outputs a gradation signal specifying a gradation to be displayed on each of the plurality of pixels based on an input video signal. The signal processing circuit includes an extraction unit that extracts, from the video signal, a first extraction signal specifying a gradation to be displayed on a predetermined number of pixels which include a first pixel assigned to display the first display color among the plurality of pixels, a second extraction signal specifying a gradation to be displayed on a predetermined number of pixels which include a second pixel assigned to display the second display color among the plurality of pixels, a third extraction signal specifying a gradation to be displayed on a predetermined number of pixels which include a third pixel assigned to display the third display color among the plurality of pixels and a fourth extraction signal specifying a gradation to be displayed on a predetermined number of pixels which include a fourth pixel assigned to display the fourth display color among the plurality of pixels, a storage unit that stores a first coefficient determined corresponding to the predetermined number of pixels including the first pixel, a second coefficient determined corresponding to the predetermined number of pixels including the second pixel, a third coefficient determined corresponding to the predetermined number of pixels including the third pixel and a fourth coefficient determined corresponding to the predetermined number of pixels including the fourth pixel, a first selection unit that selects any of the first extraction signal, the second extraction signal, a third selection signal or a fourth selection signal, a second selection unit that selects the first coefficient from the storage unit in a case where the first extraction signal is selected by the first selection unit, the second coefficient from the storage unit in a case where the second extraction signal is selected by the first selection unit, the third coefficient from the storage unit in a case where the third extraction signal is selected by the first selection unit and the fourth coefficient from the storage unit in a case where the fourth extraction signal is selected by the first selection unit, and a calculation unit that calculates the gradation signal based on the first extraction signal, the second extraction signal, the third extraction signal or the fourth extraction signal selected by the first selection unit, and the first coefficient, the second coefficient, the third coefficient or the fourth coefficient selected by the second selection unit.

The video signal is a signal which specifies a gradation to be displayed on each pixel for all of the two or more displayed colors. On the other hand, any of the two or more display colors is assigned to each pixel, and only the assigned one display color can be displayed. Therefore, even the video signal is directly supplied to a display panel, the display device cannot display the image determined by the video signal.

In contrast, the signal processing circuit according to the invention generates, based on the video signal, the gradation signal specifying the gradation to be displayed on the pixels for assigned display color (that is, performs a filter processing), and supplies this gradation signal to the display panel. That is, a display control circuit according to the invention performs the filter processing that generates the gradation signal in which the assignment of the display colors to each pixel is considered, from the video signal in which the assignment of the display colors to each pixel is not considered, and supplies the generated gradation signal to the display panel. As a result, the display device can display the image determined by the video signal.

In addition, the signal processing circuit according to the invention determines the gradation signal that specifies the gradation to be displayed on a certain pixel, based on the gradation to be displayed on a block which is a predetermined number of pixels including the certain pixel. Therefore, for example, it is possible to suppress the occurrence of the defects of display such as a moiré or a false color which occurs in a case where the difference between the gradation to be displayed on the pixel in the vicinity of a certain pixel and the gradation to be displayed on the certain pixel is significantly large. Thus, the high quality displaying can be realized.

In addition, the signal processing circuit according to the invention includes the first selection unit and the second selection unit, and each selects the single color extraction signal and the coefficient corresponding to the display color assigned to a certain pixel, respectively. Therefore, the signal processing circuit can generate a plurality of gradation signals corresponding to the plurality of display colors by one calculation unit without providing the calculation units for each display color. As a result, it is possible to reduce the circuit size of the signal processing circuit (compared to the case of providing the calculation units for each display color).

In addition, in the signal processing circuit described above, it is preferable that the calculation unit calculate and output an inner product of a first vector of which elements are each gradation to be displayed in the predetermined number of pixels represented by the single color extraction signal output from the first selection unit and a second vector of which elements are each coefficient determined corresponding to the predetermined number of pixels output from the second selection unit.

According to the aspect, the calculation unit determines the gradation signal which specifies the gradation to be displayed on a certain pixel, based on the gradation to be displayed on the block. Therefore, it is possible to suppress the occurrence of the defects of display such as the moiré and the false color. Thus, the high quality displaying can be realized.

In addition, in the signal processing circuit described above, it is preferable that the calculation unit include a multiplication unit that performs a multiplication of the gradation specified by the single color extraction signal output from the first selection unit and the coefficient output from the second selection unit, for each of the predetermined number of pixels, and outputs the multiplication value; and an addition unit that adds the multiplication value output from the multiplication unit for each of the predetermined number of pixels.

According to the aspect, the calculation unit determines the gradation signal which specifies the gradation to be displayed on a certain pixel, based on the gradation to be displayed on the block. Therefore, it is possible to suppress the occurrence of the defects of display such as the moiré and the false color. Thus, the high quality displaying can be realized.

In addition, in the signal processing circuit described above, it is preferable that a total value of the coefficients determined corresponding to the predetermined number of pixels be "one".

According to the aspect, since the total values of the coefficients of the predetermined number of the pixels, for each of two or more display colors, are all "one", a gradation balance between the two or more display colors specified by the gradation signal is equal to a gradation balance between the two or more display colors in the video signal. In other words, the change of color tone due to the generation of the gradation signal Vid from the video data Video by the calculation unit does not occur, thus a color tone that appears on the image determined by the video signal can be accurately reproduced.

In addition, since the gradation displayed on a certain pixel is determined as a weighted average of the gradation to be displayed on the block (the predetermined number of pixels), even in a case where the gradation to be displayed on the certain pixel and the gradation to be displayed on a pixel in the vicinity of the certain pixel are significantly large, the possibility of occurring the defects of display such as the moiré and the false color can be reduced.

In addition, in the signal processing circuit described above, it is preferable that the two or more display colors include three primary colors, which are red, blue and green colors, and white color; the video signal includes a first video signal which specifies the gradation to be displayed on each of the plurality of pixels with regard to the red color, a second video signal which specifies the gradation to be displayed on each of the plurality of pixels with regard to the green color, a third video signal which specifies the gradation to be displayed on each of the plurality of pixels with regard to the blue color, and a fourth video signal which specifies the gradation to be displayed on each of the plurality of pixels with regard to the white color; and the signal processing circuit include a conversion unit that generates the fourth video signal based on the first video signal, second video signal and the third video signal.

According to the aspect, the signal processing circuit generates the fourth video signal which specifies the gradation with regard to the white color, based on the video signal which specifies the gradation with regard to the red, blue and green colors. Therefore, it is possible to display the image determined by the display signal, on the display panel capable of displaying four colors of red, blue, green and white, based on the video signal that specifies the gradations with regard to the three primary colors which are red, blue and green.

In addition, according to the aspect, since the display device is capable of displaying the white color, the brightness of the entire image displayed on the display panel can be improved, compared to the case where the white color cannot be displayed.

In addition, in the signal processing circuit described above, it is preferable that the block is composed of pixels in a rows×a columns (a is an odd number equal to or greater than three) with the certain pixel as the center.

In addition, in the signal processing circuit described above, the block may be an aspect of being composed of pixels in b rows×c columns (b and c are integers equal to or greater than one).

According to the aspects, the gradation signal that specifies the gradation to be displayed on a certain pixel is determined based on the gradation to be displayed on the block. Therefore, it is possible to suppress the occurrence of the defects of display such as the moiré and the false color. Thus, the high quality displaying can be realized.

In addition, according to another aspect of the invention, a display device includes the signal processing circuit described above, a plurality of scanning lines, a plurality of data lines that intersect the plurality of scanning lines, a plurality of pixels provided corresponding to the intersections of the plurality of scanning lines and the plurality of data lines, a scanning line drive circuit that select the scanning line, and a data line drive circuit that generates and outputs a gradation potential corresponding to the gradation signal with respect to each of the plurality of data lines.

According to the invention, the display device is capable of displaying two or more display colors. An advantage of the aspect of the invention is, in a case where the pixel to which any one of display color among two or more display colors is provided, to realize the high quality display device in which the occurrence of the defects of the display is suppressed.

Furthermore, in addition to the signal processing circuit and the display device, the invention may also be conceptualized as an electronic apparatus which includes the display device. As examples of the electronic apparatuses, a projector including a pico projector, a personal computer, a mobile phone and the like may be included.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
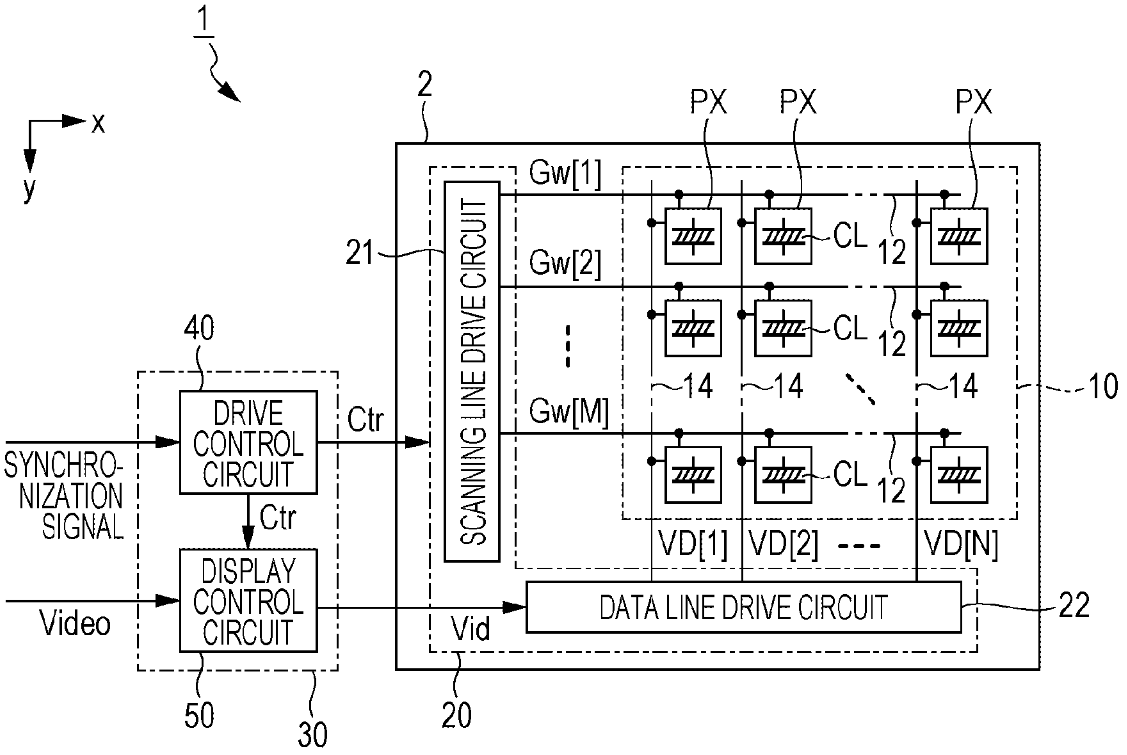
FIG. 1 is a block diagram of a display device according to the embodiment of the invention.

FIG. 1 is a block diagram of a display device 1 according to the first embodiment of the invention. The display device 1 includes a display panel 2 and a control unit 30 that controls an operation of the display panel 2.

The display panel 2 includes a display unit 10 and a drive circuit 20 that controls an operation of the display unit.

In the display unit 10 that displays an image, a plurality of pixels PX are arranged in a matrix shape. Specifically, as illustrated in FIG. 1, in the display unit 10, M lines of scanning line 12 are provided to be extended to horizontal direction (X direction) and N lines of data line 14 are provided to be extended to vertical direction (Y direction) and to mutually keep the electrical insulation with each of the scanning lines 12. Then, corresponding to the intersection of the M lines of scanning line 12 and N lines of data line 14, the pixel PX is provided. Therefore, the plurality of pixels PX in the embodiment are arranged in the matrix shape having vertical M rows×horizontal N columns. Here, any of M and N is a natural number equal to or greater than two.

In addition, in order to distinguish each scanning line 12, it may be referred to as the first row, the second row, . . . , the Mth row in an order from the top in FIG. 1. Similarly, in order to distinguish each data line 14, it may be referred to as the first column, the second column, . . . , the Nth column in an order from left to right in FIG. 1. In addition, a pixel PX located at the mth row ($1 \leq m \leq M$) and nth column ($1 \leq n \leq N$) may be written as a pixel PX [m] [n].

Figure 2:
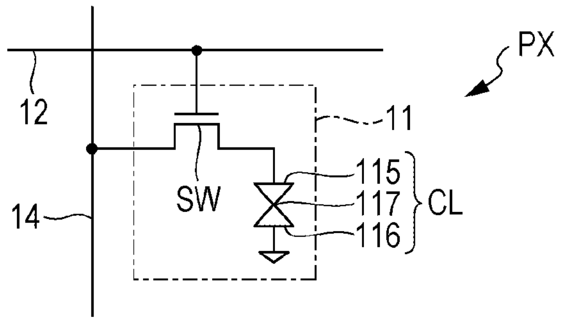
FIG. 2 is a circuit diagram of a pixel circuit.

FIG. 2 is a circuit diagram of a pixel circuit 11 included in each pixel PX. As illustrated in FIG. 2, the pixel circuit 11 included in each pixel PX includes a liquid crystal element CL and a selection switch SW. The liquid crystal element CL is an electro-optic element configured to include pixel electrode 115 and a common electrode 116 which are mutually opposed, and a liquid crystal 117 between the two electrodes. The transmittance of the liquid crystal 117 (display gradation) changes depending on the voltage applied between the pixel electrode 115 and the common electrode 116. The selection switch SW, for example, is composed of an N channel type thin film transistor of which a gate is connected to the scanning line 12. The selection switch SW is positioned between the liquid crystal pixel CL and the data line 14 and controls the electrical connection (conduction/insulation) between the two. The selection switch SW of the pixel circuit 11 included in each of the N pixels PX located in the mth row is changed to ON state simultaneously by setting the scanning signal Gw [m] to a selection potential. The liquid crystal element CL in the pixel circuit 11 included in the pixel PX displays a gradation in accordance with the gradation potential VD [n] of the data line 14 at the same time when the selection switch SW included in the pixel PX is controlled to ON state (that is, when the scanning line 12 is selected).

In addition, the circuit diagram illustrated in FIG. 2 is an example, and the pixel circuit 11 may have a configuration other than this. For example, a configuration in which an auxiliary capacitor is connected to the liquid crystal element CL in parallel may also be adopted in the pixel circuit 11.

To each of the plurality of pixels PX included in the display unit 10, any one display color among the four display colors, red, green, blue and white, is assigned. Then, each of the plurality of pixels PX can display only the assigned one display color.

Figure 3:
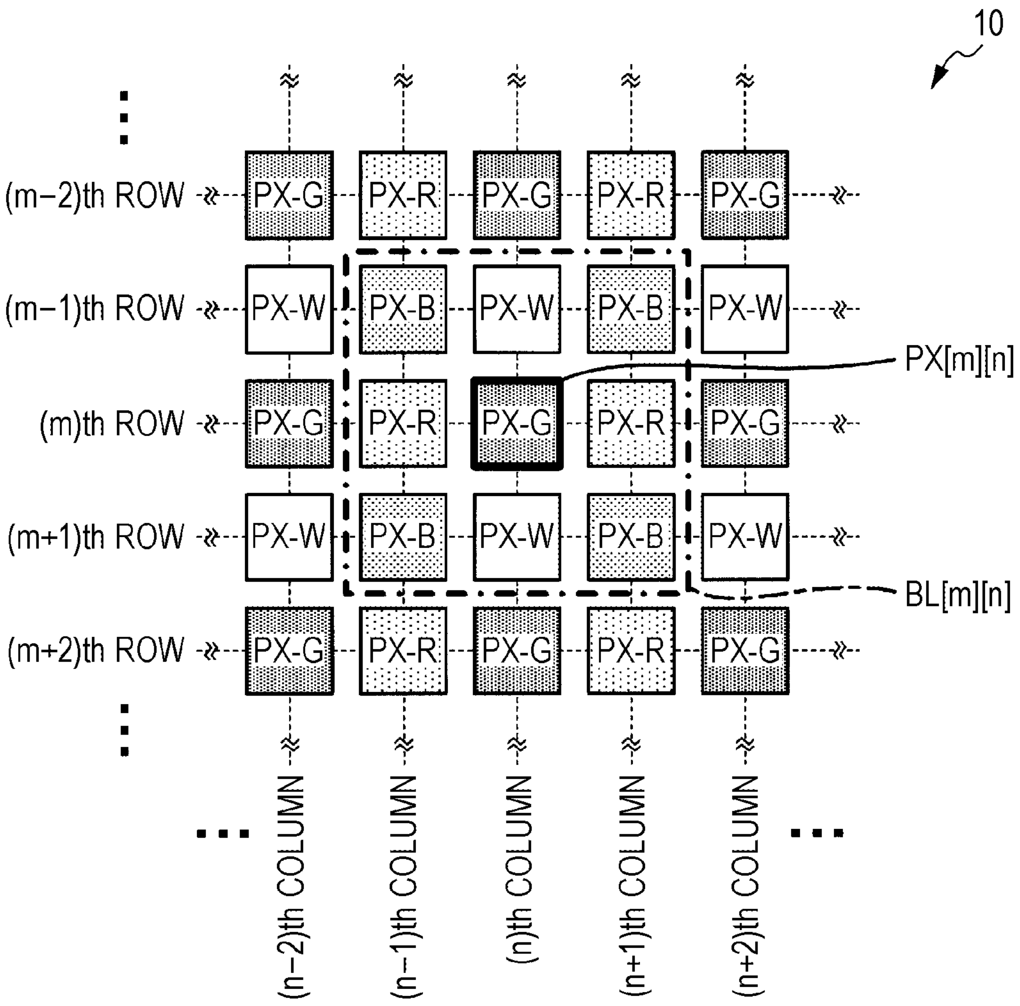
FIG. 3 is an explanatory diagram for explaining an arrangement of pixels in a display unit.

More specifically, as illustrated in FIG. 3, the plurality of pixels PX included in the display unit 10 includes a pixel PX-R capable of displaying red color, a pixel PX-G capable of displaying green color, a pixel PX-B capable of displaying blue color and a pixel PX-W capable of displaying white color. Therefore, the display unit 10 can display four display colors, red (R), green (G), blue (B) and white color (W).

Furthermore, in the embodiment, the four kinds of Pixel PX (the pixel PX-R, the pixel PX-G, the pixel PX-B and the Pixel PX-W) are arranged in a Bayer array pattern in the display unit 10. Specifically, in a certain row (for example, an even row), the pixel PX-G and the pixel PX-R are alternately arranged, and in a row adjacent to the certain row (for example, an odd row), the pixel PX-W and the pixel PX-B are alternately arranged.

The drive circuit 20 includes a scanning line drive circuit 21 and a data line drive circuit 22.

The scanning line drive circuit 21 generates a scanning signal Gw [1] to Gw [M] according to the control signal Ctr supplied from the control unit 30, and selects the scanning lines 12 from the first row to the Mth row sequentially by supplying each of the scanning signals to the scanning lines 12 from the first line to the Mth line, respectively. Specifically, the scanning line 21 sequentially selects each scanning line 12 per each horizontal scanning period by sequentially setting a predetermined selection potential to the scanning signals which are from Gw [1] to Gw [M] per each horizontal scanning period in a period of one frame.

The data line drive circuit 22 includes a DA conversion circuit (not illustrated), and generates the gradation potential VD [1] to VD [N] based on the digital gradation signal Vid supplied from the control unit 30. Then, the data line drive circuit 22 supplies a gradation potential VD [1] to VD [N] to each of the N data lines 14, in synchronization with the selection of the scanning line 12 by the scanning line drive circuit 21.

The digital video data Video is supplied to the control unit 30 in FIG. 1 from a host device (not illustrated) in synchronization with the synchronization signal. Then, the control unit 30 generates a control signal Ctr which is a signal for controlling the operation of the display panel 2 (and a display control circuit 50 (signal processing circuit) described below) based on the synchronization signal, and generates the gradation signal Vid which is a digital signal specifying the gradation displayed on the plurality of pixels PX based on the video data Video, to provide those signals to the display panel 2.

More specifically, the control unit 30 is a single integrated circuit, and includes the display control circuit 50 that supplies the gradation signal Vid to the display panel 2 and a drive control circuit 40 that controls the operations of the display panel 2 and the display control circuit 50.

The drive control circuit 40 generates the control signal Ctr based on the synchronization signal, and supplies the control signal Ctr to the drive circuit 20 and the display control circuit 50.

The display control circuit 50 generates the gradation signal Vid based on the video data Video and the control signal Ctr to supply the gradation signal Vid to the data line drive circuit 22.

Here, the synchronization signal, for example, is a signal which includes a vertical synchronization signal, horizontal synchronization signal and a dot clock signal. The control signal Ctr, for example, is a signal which includes a pulse signal, a clock signal and an enable signal.

In addition, the video data Video is data specifying the gradation to be displayed on each pixel PX respectively in 8 bits, for example, with regard to the three primary colors (RGB) which are red, green and blue. More specifically, the video data Video includes a red color video signal VsR which specifies the gradation to be displayed on each pixel PX with regard to the red color, a green color video signal VsG which specifies the gradation to be displayed on each pixel PX with regard to the green color and a blue color video signal VsB which specifies the gradation to be displayed on each pixel PX with regard to the blue color (refer to FIG. 4).

As described above, each of the plurality of pixels PX, to which any one color among the four display colors is assigned, is capable of displaying the assigned one display color. Therefore, each of the plurality of pixels PX cannot display all the three primary colors (RGB) specified by the video data Video. For example, even in a case where the display color assigned to a certain pixel PX is green color (that is, a case where the pixel PX is the pixel PX-G), the video data Video specifies, in addition to the gradation of green color to be displayed on the certain pixel PX, also the gradation with regard to the display color other than the display color assigned to the certain pixel PX such as the gradation of red color to be displayed on the certain pixel PX and the gradation of blue color to be displayed on the certain pixel PX.

On the other hand, the gradation signal Vid is data which specifies the gradation to be displayed on the pixel PX in 8 bits, for example, with regard to the display color which can be displayed on each of the plurality of pixels PX (that is, the display color assigned to each pixel PX). For example, in a case where the display color assigned to a certain pixel PX is a green color, the gradation signal Vid specifies the gradation to be displayed on the certain pixel PX only for the green color which is the display color assigned to the certain pixel PX.

In this manner, the control unit 30 performs the filter processing that generates the gradation signal Vid with considering the assignment of the display color with respect to each pixel PX, based on the video data Video determined without considering the assignment of the display color with respect to the plurality of pixel PX, and supplies the gradation signal Vid to the plurality of pixels PX (via the data line drive circuit 22).

Figure 4:
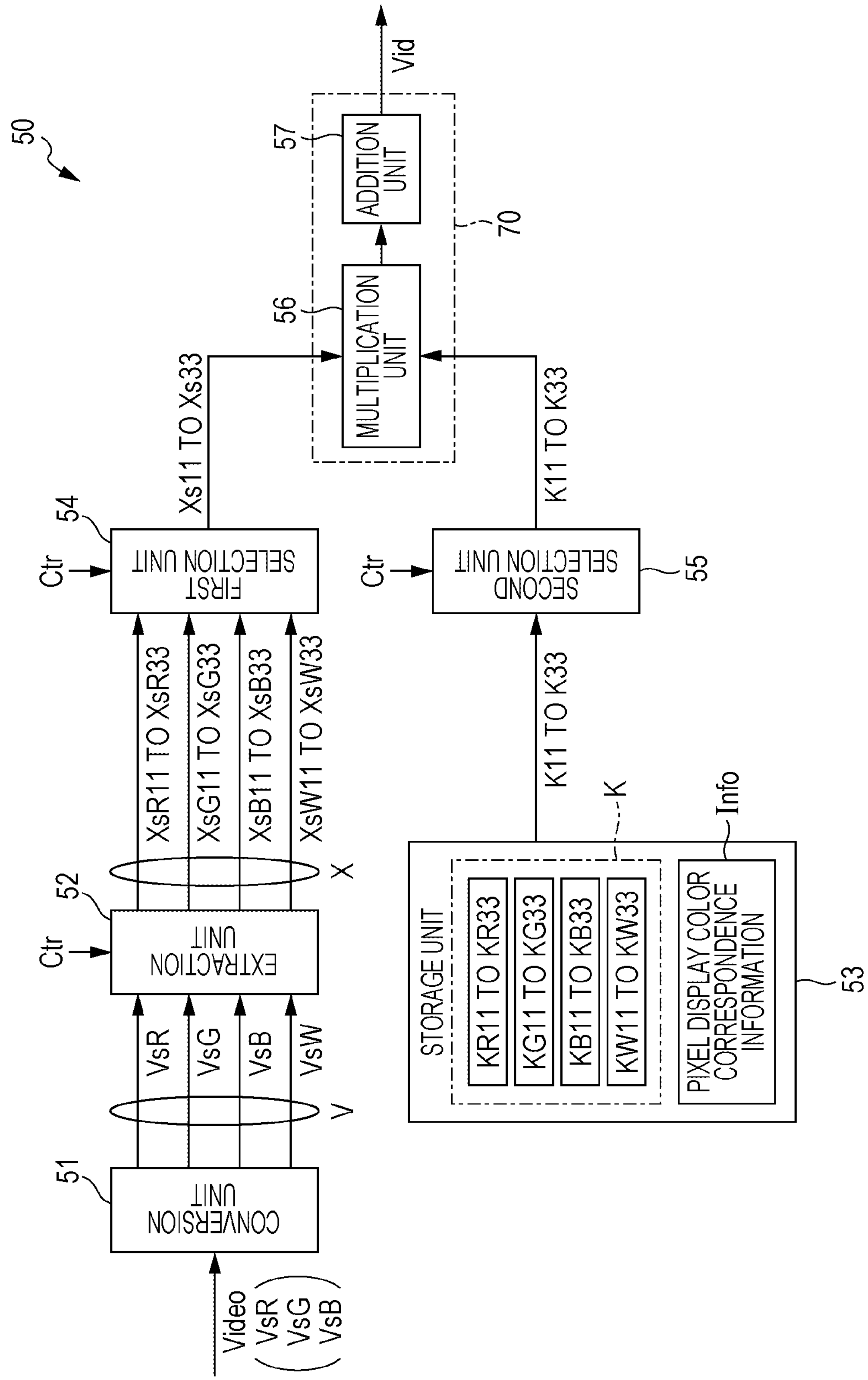
FIG. 4 is a block diagram illustrating a configuration of a display control circuit.

FIG. 4 is a block diagram illustrating a configuration of a display control circuit 50.

The display control circuit 50 includes; a conversion unit 51 that generates, based on the video data Video, a video signal V which includes a red color video signal VsR (a first video signal), a green color video signal VsG (a second video signal), a blue color video signal VsB (a third video signal) and a white color video signal VsW (a fourth video signal) which specifies the white color gradation to be displayed on each pixel PX, an extraction unit 52 that generates, based on the video signal V, an extraction signal which includes a red color extraction signal XsR, a green color extraction signal XsG, a blue color extraction signal XsB, and a white color extraction signal XsW, and a storage unit 53 that stores a red color coefficient KR, a green color coefficient KG, a blue color coefficient KB, and a white color coefficient KW.

Furthermore, hereafter, the red color video signal VsR, the green color video signal VsG, the blue color video signal VsB and the white color video signal VsW may be collectively referred to as a "single color video signal Vs", the red color extraction signal XsR, the green color extraction signal XsG, the blue color extraction signal XsB and the white color extraction signal XsW may be collectively referred to as a "single color extraction signal Xs" and the red color coefficient KR, green color coefficient KG, the blue color coefficient KB and the white color coefficient KW may be collectively referred to as a "coefficient K".

Hereafter, the conversion unit 51, the extraction unit 52 and the storage unit 53 will be described in detail.

The conversion unit 51 generates the white color video signal VsW based on the red color video signal VsR, the green color video signal VsG and the blue color video signal VsB included in the video data Video. Then, the conversion unit 51 outputs the generated four single color video signal Vs with respect to the extraction unit 52.

Furthermore, hereafter, Vs [m] [n] may represent the gradation specified by each single color video signal Vs with respect to the pixel PX [m] [n].

The extraction unit 52 specifies a block BL [m] [n] formed of the predetermined number of pixels PX which includes PX [m][n] designated by the control signal Ctr.

As illustrated in FIG. 3, in the embodiment, the block BL [m] [n] is nine pixels PX formed of eight pixels PX which surrounds the pixels [m] [n] and the pixel PX [m] [n] (that is, in the embodiment, the predetermined number is "nine"). In other words, the block BL [m] [n] in the embodiment is a nine pixel PX array in vertical three rows and horizontal three columns positioned in the (m−1)th row to (m+1)th row and the (n−1)th column to (n+1)th column, with the pixel PX [m] [n] as the center.

Next, the extraction unit 52 extracts the gradation Vs [m−1] [n−1] to Vs [m+1] [n+1] to be displayed on the predetermined number (nine) of pixels PX which forms the block BL [m] [n], from the gradation Vs [1] [1] to Vs [M] [N] to be displayed on the plurality (M×N) of pixels PX shown by the single color video signal Vs, and outputs the values representing the extracted predetermined number (nine) of gradations, as the single color extraction signal Xs.

Figure 5:
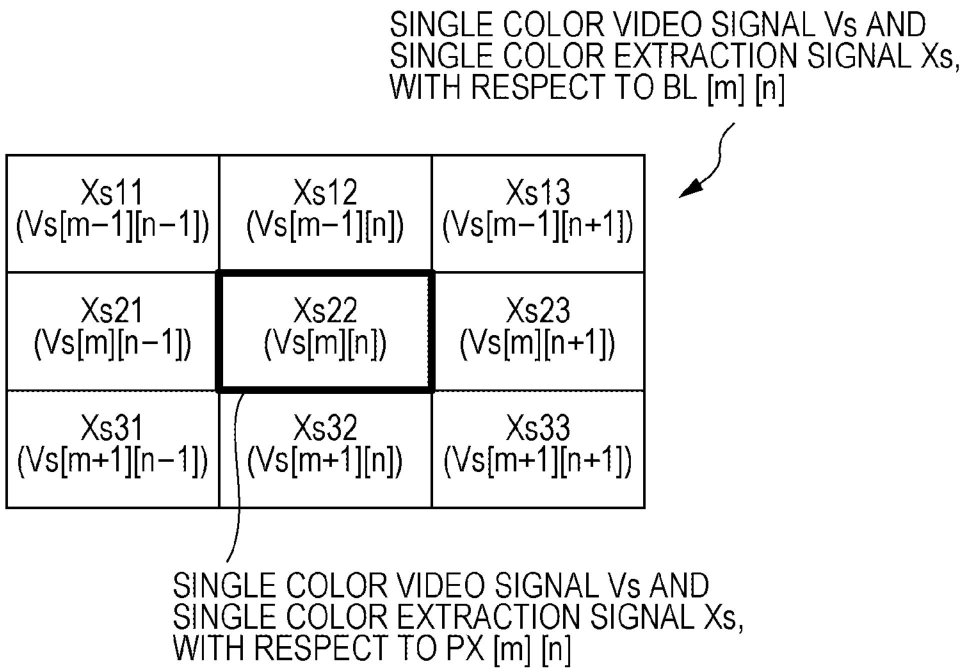
FIG. 5 is an explanatory diagram describing a single color extraction signal.

That is, as illustrated in FIG. 5, the single color extraction signal Xs includes the values of the predetermined number (nine) of pixels formed of Xs 11 (=Vs [m−1] [n−1]), Xs 12 (=Vs [m−1] [n]), Xs 13 (=Vs [m−1] [n+1]), Xs 21 (=Vs [m] [n−1]), Xs 22 (=Vs [m] [n]), Xs 23 (=Vs [m] [n+1]), Xs 31 (=Vs [m+1] [n−1]), Xs 32 (=Vs [m+1] [n]) and Xs 33 (=Vs [m+1] [n+1]).

That is, the extraction unit 52 extracts; the red color extraction signal XsR from the red color video signal VsR, the green color extraction signal XsG from the green color video signal VsG, the blue color extraction signal XsB from the blue color video signal VsB, and the white color extraction signal XsW from the white color video signal VsW.

The storage unit 53, for each of the four display colors, stores the predetermined number (nine) of coefficients K 11 to K 33 determined by one-to-one correspondence with the predetermined number (nine) of pixels PX which forms the block BL [m] [n] (that is, nine coefficients K 11 to K 33 are determined by one-to-one correspondence with the nine single extraction signals Xs 11 to Xs 33). Specifically, the storage unit 53 stores the red color coefficients KR (KR 11 to KR 33) for the red color, the green color coefficients KG (KG 11 to KG 33) for the green color, the blue color coefficients KB (KB 11 to KB 33) for the blue color and the white color coefficients KW (KW 11 to KW 33) for the white color.

In addition, the storage unit 53 stores a pixel to display color corresponding information Info. The pixel to display color corresponding information Info is information that shows which display color among four display colors is assigned with respect to each of the plurality of pixels PX, and associates the positions of each pixel PX (row and column) with the display colors (R, G, B and W) for each pixel PX.

As illustrated in FIG. 4, the display control circuit 50 includes; a first selection unit 54 that selects one single color extraction signal Xs from the four single color extraction signal Xs included in the extraction signal X based on the control signal Ctr and the pixel to display color corresponding information Info, a second selection 55 that selects one coefficient K from the red color coefficient KR, the green color coefficient KG, the blue color coefficient KB and the white color coefficient KW based on the control signal Ctr and the pixel to display color corresponding information Info, and a calculation unit 70 that generates the gradation signal Vid based on the single color extraction signal selected by the first selection unit 54 and the coefficient selected by the second selection unit 55.

Furthermore, hereafter, Vid [m] [n] may represent the gradation designated by the gradation signal Vid with respect to the pixel PX [m] [n].

Hereafter, the first selection unit 54, the second selection unit 55 and the calculation unit 70 will be described in detail.

The first selection unit 54 specifies a display color corresponding to the pixel PX [m] [n] determined by the control signal Ctr with reference to the pixel to display color corresponding information Info stored in the storage unit 53. Then, the first selection unit 54 selects a single color extraction signal Xs corresponding to the display color assigned to the pixel PX [m] [n] from among four single color extraction signals Xs to output it to the calculation unit 70.

For example, as illustrated in FIG. 3, in a case where the pixel PX [m] [n] is the pixel PX-G and the display color assigned to the pixel PX [m] [n] is green, the first selection unit 54 selects the green color extraction signals Xs G (Xs G 11 to Xs G 33) from four single color extraction signals Xs output from the extraction unit 52, and outputs them.

The second selection unit 55 specifies a display color corresponding to the pixel PX [m] [n] determined by the control signal Ctr with reference to the pixel to display color corresponding information Info stored in the storage unit 53. Then, the second selection unit 55 selects the coefficients K 11 to K 33 corresponding to the display color assigned to the pixel PX [m] [n] from among the red color coefficients KR 11 to KR 33, the green color coefficients KG 11 to KG 33, the blue color coefficients KB 11 to KB 33 and the white color coefficients KW 11 to KW 33, and outputs them to the calculation unit 70.

For example, as illustrated in FIG. 3, in a case where the display color assigned to the pixel PX [m] [n] is green, the second selection unit 55 selects the green color coefficients KG (KG 11 to KG 33) from four coefficients K, and outputs them.

The calculation unit 70 includes a multiplication unit 56 and an addition unit 57, and generates the gradation signal Vid based on the single color extraction signal Xs output from the first selection unit 54 and the predetermined number (nine) of coefficients K 11 to K 33 output from the second selection unit 55.

Specifically, the calculation unit 70 generates the gradation signal Vid based on Formula (1) below. Here, a code <x, y> appears in Formula (1) represents the inner product of the vector x and the vector y. In addition, the Vec (Xs) in Formula (1) represents, as shown in Formula (2), the nine dimensional vector of which the elements are the predetermined number (nine) of the values that is what the single color extraction signal Xs has, and the Vec (K) represents, as shown in Formula (3), the nine dimensional vector of which the elements are the predetermined (nine) number of coefficients K 11 to K 33.

$$\mathrm{Vid}[m][n]=\langle \mathrm{Vec}(Xs),\mathrm{Vec}(K)\rangle = Xs11*K11+Xs12*K12+Xs13*K13+Xs21*K21+Xs22*K22+Xs23*K23+Xs31*K31+Xs32*K32+Xs33*K33 \quad \text{Formula (1),}$$

where $$\mathrm{Vec}(Xs)=(Xs11,Xs12,Xs13,Xs21,Xs22,Xs23,Xs31,Xs32,Xs33) \quad \text{Formula (2), and}$$

$$\mathrm{Vec}(K)=(K11,K12,K13,K21,K22,K23,K31,K32,K33) \quad \text{Formula (3).}$$

That is, as shown in Formula (1), with regard to each of the predetermined number (nine) of pixels PX, which configures the block BL [m] [n], the calculation unit 70 calculates the nine multiplication values by performing the multiplication of the values which the single color extraction signal Xs has and the coefficients corresponding to the values, and calculates the gradation Vid [m] [n] as a total value of the calculated nine multiplication values.

In addition, the total value of the predetermined number (nine) of the coefficients K 11 to K 33 is determined to be "one". Specifically, all of the total values of the KR 11 to KR 33, KG 11 to KG 33, KB 11 to KB 33 and KW 11 to KW 33 are "one".

Therefore, The Vid [m] [n] calculated in Formula (1) has a meaning of a weighted average of the gradation Xs 11 to Xs 33 represented by the single color extraction signal Xs, with the coefficients K 11 to K 33 as the weights.

In addition, in the embodiment, the predetermined number (nine) of coefficients K 11 to K 33 are determined to have a larger value for the coefficient K corresponding to the pixel PX of which the distance from the pixel PX [m] [n] is closer.

Figure 6:
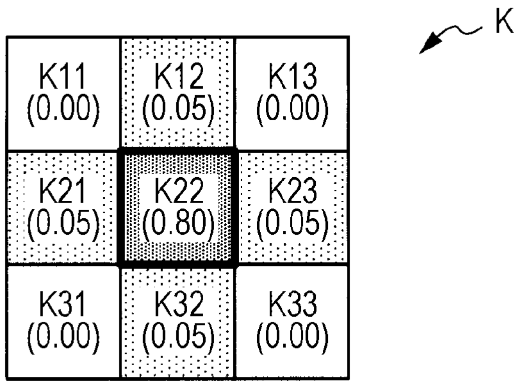
FIG. 6 is an explanatory diagram describing a predetermined number of coefficients.

Specifically, among the coefficients K 11 to K 33, the coefficient K 22 corresponding to pixel PX [m] [n] is determined to be a largest value, and the values of the four coefficients K 12, K 21, K 23 and K 32 corresponding to four pixels PX (pixel PX [m−1] [n], pixel PX [m] [n−1], pixel PX [m] [n+1] and pixel PX [m+1] [n]) which are adjacent to the pixel PX [m] [n] in a horizontal and vertical direction are determined to be larger values than the four coefficients K 11, K 13, K 31 and K 33 corresponding to the four pixels PX (pixel PX [m−1] [n−1], pixel PX [m−1] [n+1], pixel PX [m+1] [n−1] and pixel PX [m+1] [n+1]) which are adjacent to the pixel PX [m] [n] in an oblique direction. For example, as illustrated in FIG. 6, the coefficient KG 22 may be set to "0.8", the coefficients KG 12, KG 21, KG 23 and KG 32 may be set to "0.05", and the coefficients KG 11, KG 13, KG 31 and KG 33 may be set to "0.0".

In addition, the coefficients K 11 to K 33 may be set to be different for each of the four display colors, or may be set to be the same for all the four display colors.

Hereafter, the multiplication unit 56 and the addition unit 57 will be described in detail.

Figure 7A:
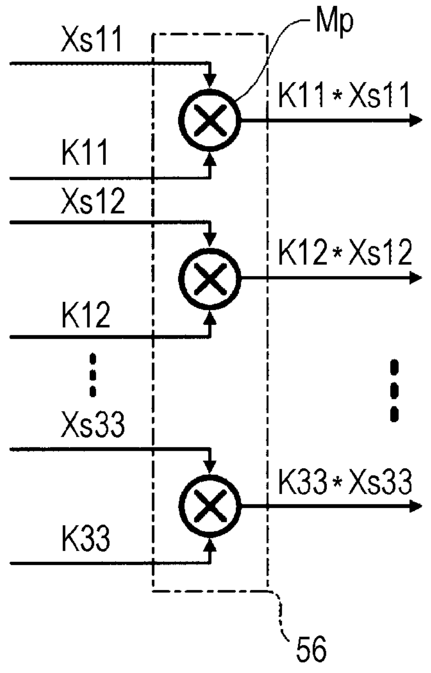
FIGS. 7A and 7B are block diagrams illustrating a configuration of a calculation unit.
Figure 7B:
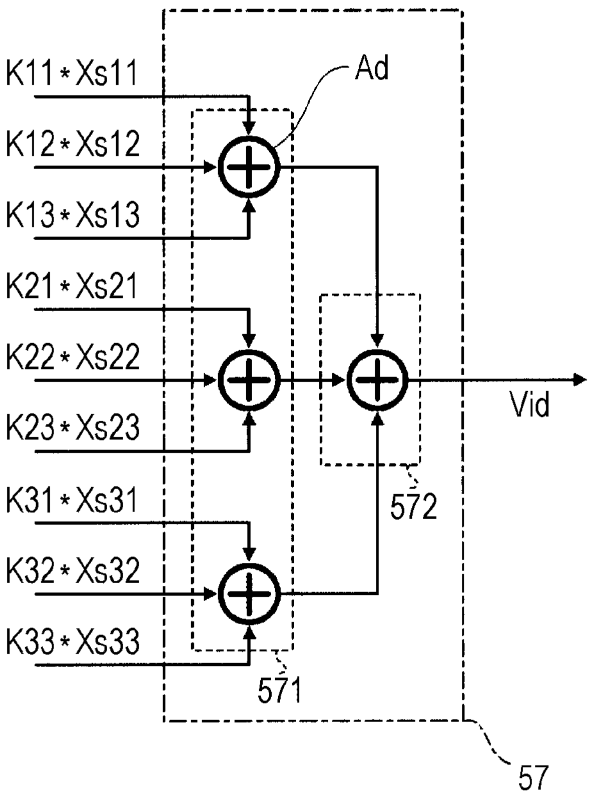

The multiplication unit 56 and the addition unit 57 are illustrated in FIGS. 7A and 7B.

As illustrated in FIG. 7A, the multiplication unit 56 includes predetermined number (nine) of multipliers Mp which calculates the multiplication of the plurality of input values. Each of the nine values that the single color extraction signals Xs have and the coefficients K corresponding to the values are input to the multipliers Mp. For example, the Xs 11 and the K 11 are input to the first multiplier Mp, and the Xs 12 and K 12 are input to the second multiplier Mp. Then, the multiplier Mp outputs the multiplication value of the two input values. For example, when the Xs 11 and the K 11 are input to the first multiplier Mp, the multiplier Mp outputs the multiplication value of the two values Xs 11*K 11. In this manner, the multiplication unit 56 calculates each of the values in the first term to ninth term (Xs 11*K 11 to Xs 33*K 33) of the right side in Formula (1).

As described in FIG. 7B, the addition unit 57 includes four adders Ad that calculates addition value of the input values. The four adders Ad are divides into three adders Ad which are disposed in the first stage 571 and one adder Ad which is disposed in the second stage 572.

Three values output from the three multipliers Mp are input to the three adders Ad disposed in the first stage 571, respectively. For example, among the three adders Ad disposed in the first stage 571, three values (Xs 11*K 11 to Xs 13*K 13) representing the first to third terms in right side in Formula (1) are input to the first adder Ad, three values (Xs 21*K 21 to Xs 23*K 23) representing the fourth to sixth terms in right side in Formula (1) are input to the second adder Ad, and three values (Xs 31*K 31 to Xs 33*K 33) representing the seventh to ninth terms in right side in Formula (1) are input to the third adder Ad. Then, each of the three adders disposed in the first stage 571 calculates the addition value of the three input values to output the addition value to the adder Ad disposed in the second stage 572.

The adder Ad disposed in the second stage 572 calculates an addition value of the three values output from the three adders Ad disposed in the first stage 571. Then, the calculation unit 70 (the adder Ad disposed in the second stage 572) outputs the addition value of the adder Ad disposed in the second stage 572 as the gradation Vid [m] [n] which is designated with respect to the pixel PX [m] [n] by the gradation signal Vid.

As described above, the display device 1 in the embodiment includes the control unit 30 that generates the gradation signal Vid based on the video data Video.

As described above, the video data Video is data that specifies the gradation to be displayed on each pixel PX with regard to the red, green and blue colors. On the other hand, any one display color, among the four display colors of red, green, blue and white, is assigned to each of the plurality of pixels PX included in the display unit 10. Therefore, in a case where the video data Video is supplied as it is, the display unit 10 cannot display the image.

In contrast, in the embodiment, the control unit 30 generates the gradation signal Vid which specifies the gradation displayed on each pixel PX considering the assignment of the display colors with respect to each pixel PX based on the video data Video.

Therefore, in the embodiment, even in a case where the host device of the display device 1 outputs the video data Video which specifies the gradation of three primary colors which are red, green and blue colors, the display panel 2 (display unit 10) which is capable of displaying the color other than three primary colors (for example, white color) can be adopted to the display device 1.

In addition, in the embodiment, the first selection unit 54 and the second selection unit 55 selects the single color extraction signal Xs and the coefficients K 11 to K 33 corresponding to the display colors assigned to the pixels PX [m] [n], and, based on the selected values, the calculation unit 70 generates the gradation Vid [m] [n] displayed on the pixel PX [m] [n] with regard to the display colors assigned to the pixel PX [m] [n].

That is, in the embodiment, since the control unit 30 includes the first selection unit 54 and the second selection unit 55, there is no need to provide four calculation units 70 which are one to one corresponding to four display colors, and the control unit 30 can have the configuration to include one calculation unit 70. In this way, in the display device 1 in the embodiment, it is possible to reduce the circuit size of the control unit 30.

In addition, in the embodiment, the control unit 30 determines the gradation Vid [m] [n] displayed on the pixel PX [m] [n] based on the gradation to be displayed on the predetermined number (nine) of pixels PX which configures the block BL [m] [n].

Therefore, for example, even in a case where the difference between gradation to be displayed on the pixels surrounding the pixel PX [m] [n] (that is, the block BL [m] [n]) and the gradation to be displayed on the pixel PX [m] [n] is large, since the gradation displayed on the pixel PX [m] [n] is determined with considering the gradation to be displayed on the surrounding pixels PX, it is possible to suppress the occurrence of the moiré and the false color and to reduce a feeling of roughness in displaying. In this way, in the embodiment, it is possible to improve the display quality.

In addition, since the display unit 10 in the embodiment includes the pixel PX-W capable of displaying the white color, the brightness of the entire image can be improved.

Modification Example

Each of the aspects described above can be modified in various ways. The specific aspects of the modifications will be described below as examples. Two or more aspects optionally selected from the modification examples described below may be appropriately combined within a range which does not conflict with each other.

Modification Example 1

In the embodiment described above, the Block BL [m] [n] is a nine pixel PX array in vertical three rows and horizontal three columns, with the pixel PX [m] [n] as the center. However, the invention is not limited to such an aspect. With a as an odd number equal to or larger than three, the block BL [m] [n] may be a (a×a) pixel PX array in vertical a rows and horizontal a columns with the pixel PX [m] [n] as the center (in this case, the predetermined number is "a*a"). For example, with a=seven, the block BL [m] [n] may be a 49 pixel PX array in seven rows and seven columns positioned at the (m−3)th row to (m+3)th row and the (n−3)th column to (n+3)th column with the pixel PX [m] [n] as the center.

Furthermore, with b and c as integers equal to or greater than one, the block BL [m] [n] may be a (b*c) pixel PX array in vertical b rows and horizontal c columns including the pixel PX [m] [n] (in this case, the predetermined number is "b*c"). For example, with b=3, c=5, the block BL [m] [n] may be a 15 pixel PX array in three rows and five columns positioned at the (m−1)th row to (m+1)th row and (n−2)th column to (n+2)th column and including the pixel PX [m] [n].

Modification Example 2

In the embodiment and modification example described above, the block BL [m] [n], for example, is an array of pixels PX in vertical b rows and horizontal c columns, that is a predetermined number of pixels PX disposed on a rectangular (or a square) region. However, the invention is not limited to such aspects. The block BL [m] [n] may have a configuration to include the predetermined pixels PX that are included in one region having a shape other than rectangle (or a square).

Figure 8:
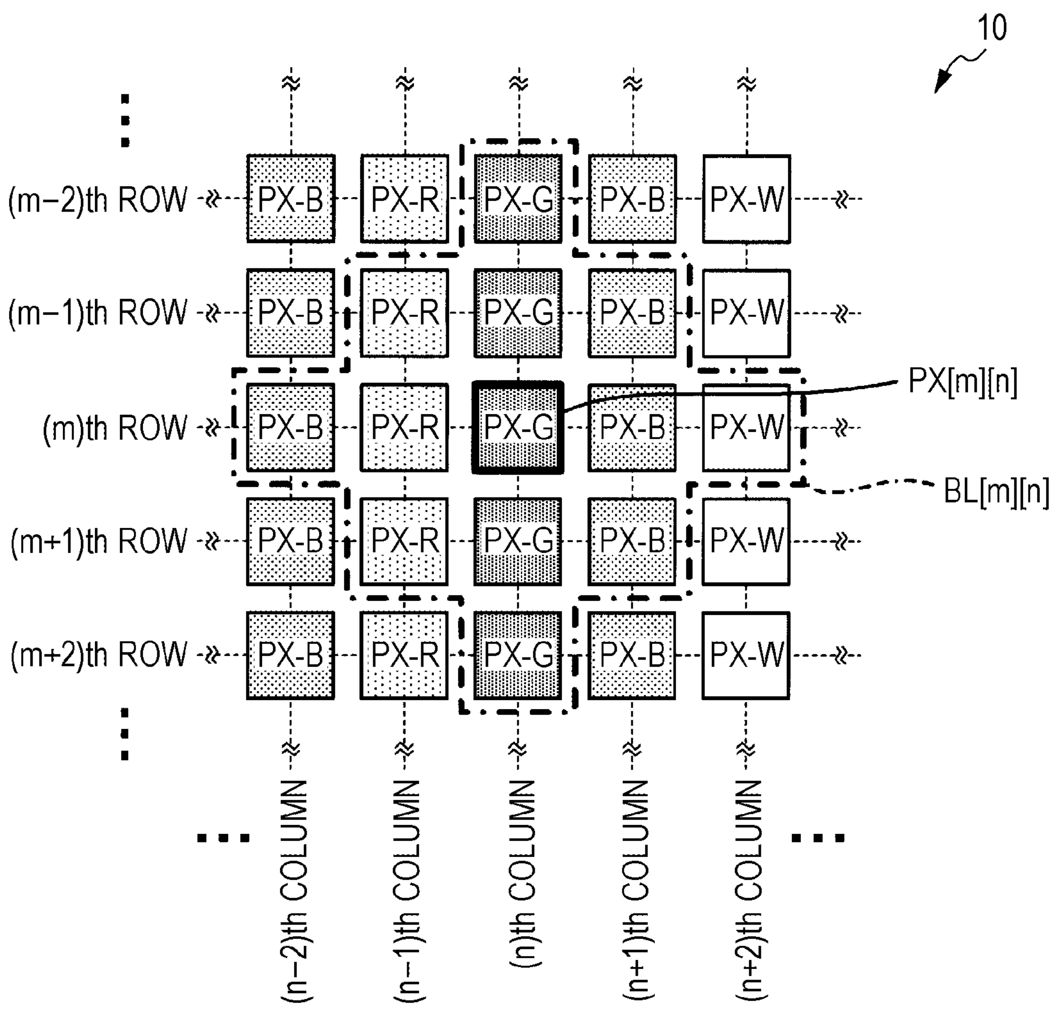
FIG. 8 is an explanatory diagram for explaining an array of pixels in a display unit according to a modification example 2 and 3.

For example, as illustrated in FIG. 8, the block BL [m] [n] may have a configuration to include 13 pixels PX which are the pixel PX, four pixels adjacent to the pixel PX [m] [n] in the vertical and horizontal directions and the pixels PX adjacent to the four pixels PX in the vertical and horizontal direction (in this case, the predetermined number is "13").

Modification Example 3

In the embodiment and modification examples described above, as illustrated in FIG. 3, four types of pixels PX (pixel PX-R, pixel PX-G, pixel PX-B and pixel PX-W) are arranged in a Bayer array pattern in the display unit 10. However, the invention is not limited to such aspects. Four types of pixels PX may be arranged in accordance with any type of rules in the display unit 10. For example, as illustrated in FIG. 8, only one color of pixel PX may be arranged for each column.

Even in a case where the pixels PX are arranged in any types, since the display color assigned to each pixel PX is stored in the storage unit 53 as a pixel to display color corresponding information Info, the control unit 30 can generate the gradation signal Vid which designates the gradation with regard to the display color assigned to each pixel PX (the display color which can be displayed on each pixel PX).

Modification Example 4

In the embodiment and modification examples described above, the display unit 10 can display the four colors, red (R), green (G), blue (B) and white (W) colors. However, the invention is not limited to such aspects. The display unit 10 may have a configuration capable of displaying only a part of display colors among the four display colors, red (R), green (G), blue (B) and white (W) colors. For example, the display unit 10 may have a configuration capable of displaying the three display colors, red (R), green (G), and blue (B) (three primary colors). In addition, the display unit 10 may have a configuration capable of displaying the display color other than the four display colors, red (R), green (G), blue (B) and white (W) colors. In short, the display unit 10 may have any configuration capable of displaying two or more display colors.

In this case, the conversion unit 51, for each of the two or more display colors, may generate the single color video signal Vs which specifies the gradation to be displayed on each pixel PX. The extraction unit 52, for each of the two or more display colors, may generate the single color extraction signal Xs that specifies the gradation to be displayed on the block BL [m] [n] which is a predetermined number of pixels PX including the pixel PX [m] [n]. In addition, in this case, the storage unit 53, for each of the two or more display colors, may store the predetermined number of coefficients K determined by one-to-one correspondence with the predetermined number of pixels PX.

Modification Example 5

In the embodiment and modification examples described above, the addition unit 57 includes three adders Ad in the first stage 571. However, the invention is not limited to such aspects. Two adders Ad, or four or more adders may be disposed in the first stage 571.

Figure 9:
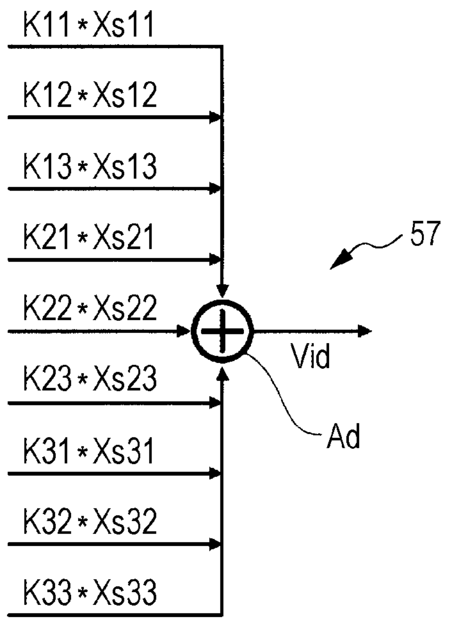
FIG. 9 is a block diagram illustrating a configuration of the calculation unit according to a modification example 5.

In the embodiment and modification examples described above, the addition unit 57 includes a plurality of adders Ad disposed in two stages (that is, disposed in the first stage 571 and the second stage 572). However, the invention is not limited to such aspects. The addition unit 57 may include a plurality of adders Ad disposed in three stages. In addition, the addition unit 57, as illustrated in FIG. 9, may include an adder Ad disposed in one stage (that is, one adder Ad)

However, in a case where the number of pixels PX (predetermined number) which configures the block BL [m] [n] is large, it is preferable that the addition unit 57 include a plurality of adders Ad disposed in two or more stages.

Modification Example 6

In the embodiment and modification examples described above, the calculation unit 70 includes the multiplication unit 56 and the addition unit 57. However, the invention is not limited to such aspects. The calculation unit 70 may have any configuration as long as the calculation illustrated in Formula (1) can be performed.

Modification Example 7

In the embodiment and modification examples described above, the storage unit 53 stores the predetermined number of coefficients K for each display colors which can be displayed on the display panel 2 (for example, nine coefficients K 11 to K 33 for each RGBW) in group-by-group. However, the invention is not limited to such aspects. The storage unit 53 may store a plurality of groups composed of predetermined number of coefficients K for each display color. Specifically, in the embodiment, the storage unit 53 may store a plurality of groups for the red color coefficients KR 11 to KR 33, a plurality of groups for the green color coefficients KG 11 to KG 33, a plurality of groups for the blue color coefficients KB 11 to KB 33 and a plurality of groups for the white color coefficients KW 11 to KW 33. For example, with regard to the green color coefficients KG, the storage unit 53 may store a group in which the coefficient KG 22 is set to "0.8", the coefficients KG 12, KG 21, KG 23 and KG 32 are set to "0.05", and the coefficients KG 11, KG 13, KG 31 and KG 33 are set to "0", and a group in which the coefficient KG 22 is set to "0.6", the coefficients KG 12, KG 21, KG 23 and KG 32 are set to "0.1" and the coefficients KG 11, KG 13, KG 31 and KG 33 are set to "0".

In addition, the display device 1 may have a configuration capable of performing a plurality of display mode depending on the applications such as a display mode for displaying the characters and a display mode for displaying the landscapes. In this case, the second selection unit 55 may have a configuration capable of selecting a group of coefficients K 11 to K 33 corresponding to the display mode among the plurality of groups of coefficients K 11 to K 33.

In addition, in the embodiment and modification examples described above, the storage unit 53 stores the predetermined number of coefficients K for each display colors (for example, nine coefficients K 11 to K 33 for each RGBW) in group-by-group. However, the invention is not limited to such aspects. The storage unit 53 may store the coefficients K less than the predetermined number for each display color in group-by-group. For example, in a case where the values of the coefficients K 11 to K 33 are determined to be as illustrated in FIG. 6, the storage unit 53 may store three coefficients K; those are the coefficient K 22(=0.8) corresponding to the pixel PX [m] [n], the coefficient K 12(=K 21=K 23=K 32=0.05) corresponding to four pixels PX adjacent to the pixel PX [m] [n] in vertical and horizontal directions and the coefficient K 11 (=K 13=K 31=K 33=0) corresponding to four pixels PX adjacent to the pixel PX [m] [n] in oblique directions. In short, the storage unit 53 may store one or a plurality of coefficients K determined so as to correspond to the predetermined number of pixels PX which configures the block BL [m] [n].

Modification Example 8

In the embodiment and modification examples described above, the total value of the predetermined number of coefficients K (for example, nine coefficients K 11 to K 33) is determined so as to be "one". However, the invention is not limited to such aspects. The total value of the predetermined number of coefficients K may be determined so as to be a value other than "one".

For example, in the display device 1 (the host device), the brightness of the entire image displayed on the display unit 10 can be set, and the total value of the predetermined number of coefficients K may be set to a value corresponding to the brightness of the entire image determined by the display device 1.

Modification Example 9

In the embodiment and modification examples described above, the control unit 30 is a single integrated circuit. The invention is not limited to such aspects. The control unit 30 may be dispersedly mounted on the plurality of integrated circuits. For example, the drive control circuit 40 and the display control circuit 50 may be dispersedly mounted on the separate integrated circuits.

Modification Example 10

In the embodiment and modification examples described above, the display panel 2 and the control unit 30 are separated each other. However, the invention is not limited to such aspects. The display panel 2 and the control unit 30 may be formed on the same substrate.

Modification Example 11

In the embodiment and modification examples described above, the gradation signal Vid is a digital signal. However, the invention is not limited to such aspects. The gradation signal Vid may be an analog signal. For example, the gradation signal Vid may be a time-division multiplexed signal of a gradation potential VD [1] to VD [N].

In this case, the control unit 30 may include a DA conversion circuit and generate the gradation signal Vid by a DA conversion of the digital value output from the calculation unit 70.

Modification Example 12

In the embodiment and modification examples described above, the pixel circuit 11 included in the pixel PX includes a liquid crystal element CL. However, the invention is not limited to such aspects. The pixel circuit 11, for example, may include a drive transistor which flows an electric current corresponding to the gradation potential VD [1] to VD [N] and a light emitting element such as an Organic Light Emitting Diode (OLED) which emits light with a brightness corresponding to the electric current or a Light Emitting Diode (LED).

Application Example

The display device 1 illustrated in each of the aspects described above can be used in various electronic apparatuses. Specific aspects of the electronic apparatuses in which the display device 1 is applied are illustrated in FIG. 10 to FIG. 12.

Figure 10:
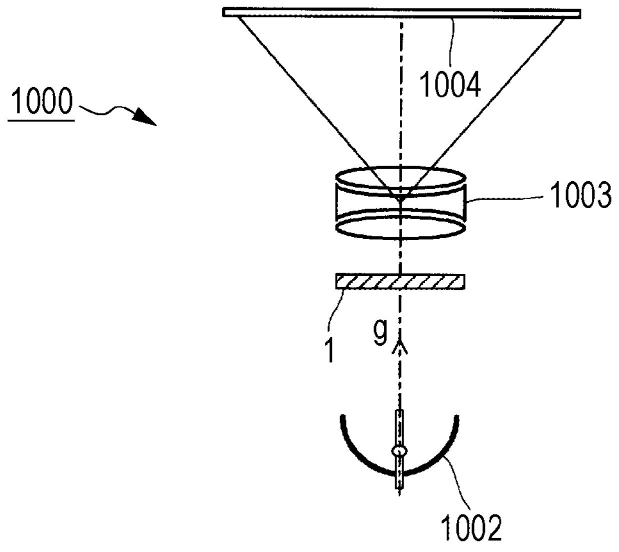
FIG. 10 is a perspective view of an electronic apparatus (a projection type display device).

FIG. 10 is a schematic diagram of a projection type display device (a projector) 1000 in which the display device 1 is applied. The projection type display device 1000 is configured to include the display device 1. Emitted light from an illumination device (a light source) 1002 is supplied to the display device 1. The display device 1 functions as a light modulator (a light valve) which modulates the emitted light supplied from the illumination device (the light source) 1002 in accordance with the display image. A projection optical system 1003 projects the emitted light from the display device 1 onto the projection surface 1004. An observer visually recognizes the projected image on the projection surface 1004.

Figure 11:
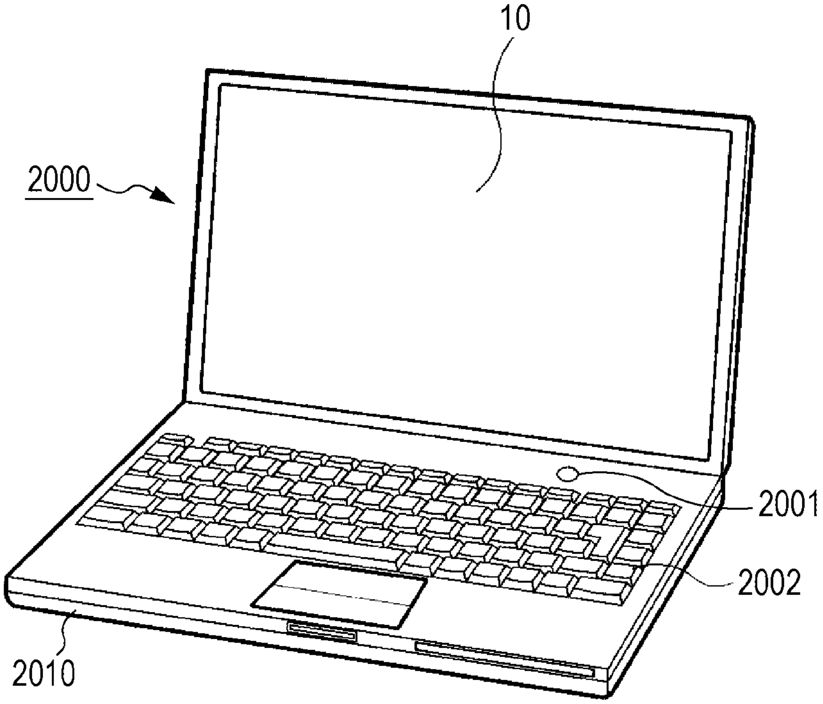
FIG. 11 is a perspective view of an electronic apparatus (a personal computer).

FIG. 11 is a perspective view of a portable personal computer in which an electro-optic apparatus 10 is adopted. The personal computer 2000 includes the electro-optic apparatus 10 which displays various images, and a main body unit 2010 on which a power source switch 2001 and a key board 2002 are installed.

Figure 12:
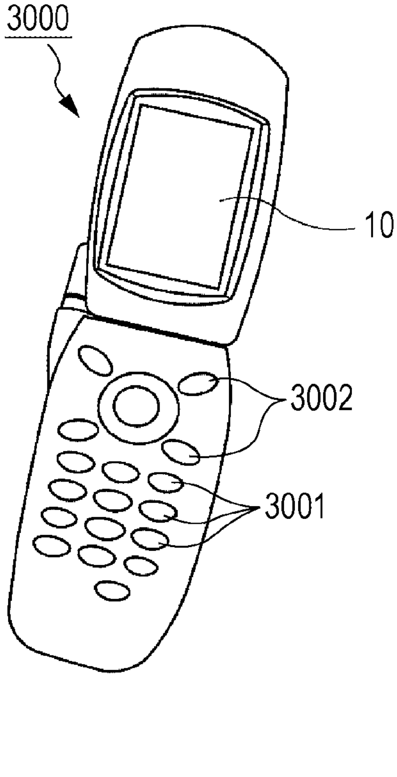
FIG. 12 is a perspective view of an electronic apparatus (a mobile phone).

FIG. 12 is a perspective view of a mobile phone in which the electro-optic apparatus 10 is adopted. The mobile phone 3000 includes a plurality of operation buttons 3001 and scroll buttons 3002, and the electro-optic apparatus 10 which displays various images. By operating the scroll buttons 3002, the images displayed on the electro-optic apparatus 10 are scrolled.

Furthermore, in addition to the electronic apparatuses illustrated in FIG. 10 to FIG. 12, examples of the electronic apparatuses in which the electro-optic apparatus according to the invention is adopted, may include a Personal Digital Assistance (PDA), a smart phone, a digital still camera, a television set, a video camera, a car navigation system, an indicator of automotive (an instrument panel), an electronic diary, an electronic paper, a calculator, a word processor, a workstation, a videophone terminal, a POS terminal, a printer, a scanner, a copier, a video player, an apparatus with a touch panel and the like.

This application claims priority to Japan Patent Application No. 2012-139475 filed Jun. 21, 2012, the entire disclosures of which are hereby incorporated by reference in their entireties.

What is claimed is:

1. A signal processing circuit that is a display processing circuit used in a display device in which any of a first display color and a second display color is assigned to each of a plurality of pixels, and outputs a gradation signal specifying a gradation to be displayed on each of the plurality of pixels based on an input video signal, the signal processing circuit comprising:

- an extraction unit that extracts, from the video signal, a first extraction signal specifying a gradation to be displayed on a predetermined number of pixels which include a first pixel assigned to display the first display color among the plurality of pixels, and a second extraction signal specifying a gradation to be displayed on a predetermined number of pixels which include a second pixel assigned to display the second display color among the plurality of pixels;
- a storage unit that stores a first coefficient determined corresponding to the predetermined number of pixels including the first pixel and a second coefficient determined corresponding to the predetermined number of pixels including the second pixel;

a first selection unit that selects the first extraction signal or the second extraction signal;

a second selection unit that selects the first coefficient from the storage unit in a case where the first extraction signal is selected by the first selection unit, and selects the second coefficient from the storage unit in a case where the second extraction signal is selected by the first selection unit; and a calculation unit that calculates the gradation signal based on the first extraction signal or the second extraction signal selected by the first selection unit and the first coefficient or the second coefficient selected by the second selection unit.

2. The signal processing circuit according to claim 1, wherein the calculation unit calculates an inner product of a first vector of which elements are each gradation to be displayed on the predetermined number of pixels including the first pixel represented by the first extraction signal selected by the first selection unit and a second vector of which elements are each coefficient determined corresponding to the predetermined number of pixels including the first pixel represented by the first coefficient selected by the second selection unit, or wherein the calculation unit calculates an inner product of a first vector of which elements are each gradation to be displayed on the predetermined number of pixels including the second pixel represented by the second extraction signal selected by the first selection unit and a second vector of which element are each coefficient determined corresponding to the predetermined number of pixels including the second pixel represented by the second coefficient selected by the second selection unit.

3. The signal processing circuit according to claim 1, wherein the calculation unit includes;

a multiplication unit that performs a multiplication of the gradation specified by the first extraction signal selected by the first selection unit and the first coefficient selected by the second selection unit, for each of the predetermined number of pixels including the first pixel, and an addition unit that adds the multiplication values acquired by the multiplication unit for each of the predetermined number of pixels including the first pixel.

4. The signal processing circuit according to claim 1, wherein a total value of the coefficients determined corresponding to the predetermined number of pixels including the first pixel is "one".

5. A signal processing circuit that is a display processing circuit used in a display device in which any of a first display color, a second display color, a third display color and a fourth display color is assigned to each of a plurality of pixels, and outputs a gradation signal specifying a gradation to be displayed on each of the plurality of pixels based on an input video signal, the signal processing circuit comprising:

an extraction unit that extracts, from the video signal, a first extraction signal specifying a gradation to be displayed on the predetermined number of pixels which include a first pixel assigned to display the first display color among the plurality of pixels, a second extraction signal specifying a gradation to be displayed on the predetermined number of pixels which include a second pixel assigned to display the second display color among the plurality of pixels, a third extraction signal specifying a gradation to be displayed on a predetermined number of pixels which include a third pixel assigned to display the third display color among the plurality of pixels and a fourth extraction signal specifying a gradation to be displayed on a predetermined number of pixels which include a fourth pixel assigned to display the fourth display color among the plurality of pixels;

a storage unit that stores a first coefficient determined corresponding to the predetermined number of pixels including the first pixel, a second coefficient determined corresponding to the predetermined number of pixels including the second pixel, a third coefficient determined corresponding to the predetermined number of pixels including the third pixel and a fourth coefficient determined corresponding to the predetermined number of pixels including the fourth pixel;

a first selection unit that selects any of the first extraction signal, the second extraction signal, a third selection unit and a fourth extraction signal;

a second selection unit that selects the first coefficient from the storage unit in a case where the first extraction signal is selected by the first selection unit, the second coefficient from the storage unit in a case where the second extraction signal is selected by the first selection unit, the third coefficient from the storage unit in a case where the third extraction signal is selected by the first selection unit and the fourth coefficient from the storage unit in a case where the fourth extraction signal is selected by the first selection unit; and a calculation unit that calculates the gradation signal based on the first extraction signal, the second extraction signal, the third extraction signal or the fourth extraction signal selected by the first selection unit, and the first coefficient, the second coefficient, the third coefficient or the fourth coefficient selected by the second selection unit.

6. The signal processing circuit according to claim 5, wherein the first display color is a red color, wherein the second display color is a blue color, wherein the third display color is a green color, and wherein the fourth display color is a white color.

7. The signal processing circuit according to claim 5, wherein the predetermined number of pixels including the first pixel are composed of pixels in a rows×a columns (a is an odd number equal to or greater than three) with the first pixel as the center.

8. The signal processing circuit according to claim 5, wherein the predetermined number of pixels including the first pixel are composed of pixels in b rows×c columns (b and c are integers equal to or greater than one).

9. A display device comprising:

the signal processing circuit according to claim 1;

a plurality of scanning lines;

a plurality of data lines that intersect the plurality of scanning lines;

a plurality of pixels provided corresponding to the intersections of the plurality of scanning lines and the plurality of data lines;

a scanning line drive circuit that select the scanning line; and a data line drive circuit that generates and outputs a gradation potential corresponding to the gradation signal with respect to each of the plurality of data lines.

10. A display device comprising:

the signal processing circuit according to claim 5;

a plurality of scanning lines;

a plurality of data lines that intersect the plurality of scanning lines;

a plurality of pixels provided corresponding to the intersections of the plurality of scanning lines and the plurality of data lines;

a scanning line drive circuit that select the scanning line; and a data line drive circuit that generates and outputs a gradation potential corresponding to the gradation signal with respect to each of the plurality of data lines.

11. An electronic apparatus comprising:

the display device according to claim 9.

12. An electronic apparatus comprising:

the display device according to claim 10.

* * * * *